(12) United States Patent
An et al.

(10) Patent No.: US 11,122,173 B2
(45) Date of Patent: Sep. 14, 2021

(54) IMAGE FORMING APPARATUS AND ELECTRONIC DEVICE INCLUDING A STRUCTURALLY ISOLATED VIBRATING USER INTERFACE

(71) Applicant: HP PRINTING KOREA CO., LTD., Suwon-si (KR)

(72) Inventors: Hwi-kyeong An, Seoul (KR); Sung-weon Song, Yongin-si (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 723 days.

(21) Appl. No.: 14/935,919

(22) Filed: Nov. 9, 2015

(65) Prior Publication Data

US 2016/0373597 A1 Dec. 22, 2016

(30) Foreign Application Priority Data

Jun. 17, 2015 (KR) .................. 10-2015-0085644

(51) Int. Cl.
| | | |
|---|---|---|
| *H04N 1/00* | (2006.01) | |
| *G06F 3/01* | (2006.01) | |
| *G06F 1/16* | (2006.01) | |
| *G06F 3/147* | (2006.01) | |

(52) U.S. Cl.
CPC ....... *H04N 1/00411* (2013.01); *G06F 1/1643* (2013.01); *G06F 1/1658* (2013.01); *G06F 3/016* (2013.01); *G06F 3/147* (2013.01); *H04N 1/00488* (2013.01); *H04N 1/00493* (2013.01); *H04N 1/00559* (2013.01); *G09G 2354/00* (2013.01); *H04N 2201/0094* (2013.01)

(58) Field of Classification Search
CPC ............................ G06F 3/016; H04N 1/00559
See application file for complete search history.

(56) References Cited

U.S. PATENT DOCUMENTS

| | | | |
|---|---|---|---|
| 8,508,486 B2 | 8/2013 | Grant et al. | |
| 8,576,188 B2* | 11/2013 | Miles ...................... | G06F 3/016 345/173 |
| 8,884,747 B2 | 11/2014 | Woo et al. | |
| 2002/0043607 A1* | 4/2002 | Tajima .................... | G09F 15/00 248/473 |

(Continued)

FOREIGN PATENT DOCUMENTS

| | | |
|---|---|---|
| CN | 103246390 | 8/2013 |
| KR | 10-2010-0075469 | 7/2010 |

(Continued)

OTHER PUBLICATIONS

International Search Report and Written Opinion of the International Searching Authority dated Jul. 6, 2016 in International Patent Application No. PCT/KR2016/002184.

*Primary Examiner* — Benjamin O Dulaney
(74) *Attorney, Agent, or Firm* — Staas & Halsey LLP

(57) ABSTRACT

An electronic device having a display includes a base connected to a part of a main body of the electronic device, the display configured to receive a touch input and integrally formed with at least one support, and at least one vibrator arranged on the display to vibrate the display in accordance with the touch input, wherein the display is apart from the base in a portion excluding the support.

20 Claims, 17 Drawing Sheets

(56) References Cited

U.S. PATENT DOCUMENTS

| | | | |
|---|---|---|---|
| 2006/0181522 A1* | 8/2006 | Nishimura | G06F 3/016 345/177 |
| 2008/0232050 A1 | 9/2008 | Muraki | |
| 2010/0020489 A1 | 1/2010 | Wang | |
| 2010/0090814 A1* | 4/2010 | Cybart | G06F 3/016 340/407.2 |
| 2012/0092272 A1* | 4/2012 | Miles | G06F 3/016 345/173 |
| 2013/0058682 A1 | 3/2013 | Saiki et al. | |
| 2013/0141225 A1* | 6/2013 | Son | G06F 3/016 340/407.1 |
| 2013/0201127 A1* | 8/2013 | Abe | G06F 3/016 345/173 |
| 2013/0229088 A1 | 9/2013 | Jung et al. | |
| 2013/0271412 A1* | 10/2013 | Adachi | H01L 41/0472 345/173 |
| 2013/0335211 A1* | 12/2013 | Kobayashi | H04M 1/0266 340/407.2 |
| 2013/0342484 A1* | 12/2013 | Bae | G06F 3/016 345/173 |
| 2014/0028573 A1* | 1/2014 | Olien | H01L 41/35 345/173 |
| 2014/0176318 A1* | 6/2014 | Kono | G06F 3/016 340/407.2 |
| 2014/0176462 A1 | 6/2014 | Ponziani | |

FOREIGN PATENT DOCUMENTS

| | | |
|---|---|---|
| KR | 10-1300455 | 8/2013 |
| KR | 10-2014-0081723 | 7/2014 |
| TW | 201246777 | 11/2012 |

\* cited by examiner

IMAGE FORMING APPARATUS AND ELECTRONIC DEVICE INCLUDING A STRUCTURALLY ISOLATED VIBRATING USER INTERFACE

CROSS-REFERENCE TO RELATED APPLICATIONS

This application claims priority from Korean Patent Application No. 10-2015-0085644 filed on Jun. 17, 2015 in the Korean Intellectual Property Office, the disclosure of which is incorporated herein by reference in its entirety

BACKGROUND

1. Field

The present disclosure relates to an image forming apparatus and an electronic device, and more particularly, to an image forming apparatus and an electronic device, which include a display having a haptic function that generates vibrations in response to a user's touch input.

2. Description of the Related Art

In general, an image forming apparatus, such as a copy machine or a printer, is provided with a display device that provides information about various setting and printing statuses to a user. The display device provided in the image forming apparatus may include an actuator that generates vibrations as a feedback in response to a touch input that is input through a touch screen, and thus the user can easily recognize whether the user's touch input has been accurately made.

However, according to a display device that is used in an image forming apparatus in the related art, because a display is fixed to a base, vibrations that are generated from an actuator are transferred to the whole display device, and as shown in FIG. 1, are further transferred to a main body 3 of the image forming apparatus 1 through a hinge arm 5. In the case where the vibrations are extendedly transferred to the main body 3 of the image forming apparatus in addition to the display device 7, the vibrations that can be recognized by the user who touches the touch screen become weak, and thus it is not easy for the user to accurately grasp whether the user's touch input has been properly performed.

In the above-described case, it is necessary to heighten the strength of the vibrations so that feedback can be accurately given to the user who has performed the touch input, and this causes the capacity of the installed actuator to be increased. In this case, as the size of the actuator is increased, the size of the display device 7 in which the actuator is built is also increased.

Further, as the size of the actuator is increased, a reaction speed of the actuator that operates in response to the user's touch input is lowered in comparison to the reaction speed of an actuator having a small size, and due to this, a reaction time in which the user can recognize the vibrations becomes later than a touch input time. If a gap between the user touch input time and the actuator reaction time is lengthened, the actuator's reaction may be made in a state where a user's finger has already been separated from the touch screen, and this may cause the user to be unable to recognize the feedback through the vibrations with respect to the user's touch input.

SUMMARY

Exemplary embodiments of the present disclosure overcome the above disadvantages and other disadvantages not described above, and provide a display device of an image forming apparatus, which can enable a user to accurately recognize vibrations according to a user's touch input using a small vibrator.

According to an aspect of the present disclosure, an electronic device having a display includes a base connected to a part of a main body of the electronic device; the display configured to receive a touch input and integrally formed with at least one support; and at least one vibrator arranged on the display to vibrate the display in accordance with the touch input, wherein the display is apart from the base in a portion excluding the support.

The display may be elastically supported on the base through the support.

The support may support the display so that the display vibrates in a direction that is vertical to the base.

A rear surface of the display may be arranged to be apart from a front surface of the base.

The display may be indirectly connected to the base through a fastener to keep a gap distance from the base.

The support may support the display so that the display vibrates in a direction that is horizontal to the base.

The support may be symmetrically formed on opposite sides of the display.

The electronic device may further include at least one guide member having one side fixed to the base and configured to guide the display in the horizontal direction, wherein a slot, into which a part of the display is slidably inserted, is formed on the guide member.

A part of the support may be separably coupled to the base.

The support may include a support projection extending from the display; and a coupling projection formed to extend from a front end of the support projection and slidably coupled to a coupling hole formed on the base.

The support may include a coupling projection extending from the display; an arm formed at a front end of the coupling projection; and a fixing projection formed at a front end of the arm and coupled to a fixing hole formed on the base.

The base may have an edge portion that surrounds a side end portion of the display, and the side end portion of the display may be arranged to be apart from the edge portion.

A frequency of the vibrator may coincide with a natural frequency of the support.

The display may include a touch screen configured to receive the touch input and a plastic frame configured to support a rear surface of the touch screen, wherein the support is formed to project from the frame.

The frame and the support may be integrally injection-molded.

The frame may be in the form of a rectangular closed loop that corresponds to four sides of the touch screen, and the elastic support may be formed on at least two sides among four sides of the frame.

The electronic device may further include a buffering member arranged between the base and the display.

A plurality of supports may be provided.

The electronic device may be any one of an image forming apparatus, medical equipment, and industrial equipment.

According to an aspect of the present disclosure, an image forming apparatus having a display includes a base connecting the display to a part of a main body of the image forming apparatus; and at least one vibrator fixed to a part of the display to vibrate the display, wherein the display includes a touch screen configured to receive a touch input, a frame configured to support a rear surface of the touch screen, and a plurality of supports integrally formed to project from the frame, and the plurality of supports are separably connected to the base so that the display is apart from the base in a portion excluding the plurality of supports.

Additional and/or other aspects and advantages of the disclosure will be set forth in part in the description which follows and, in part, will be obvious from the description, or may be learned by practice of the disclosure.

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION

Figure 1:
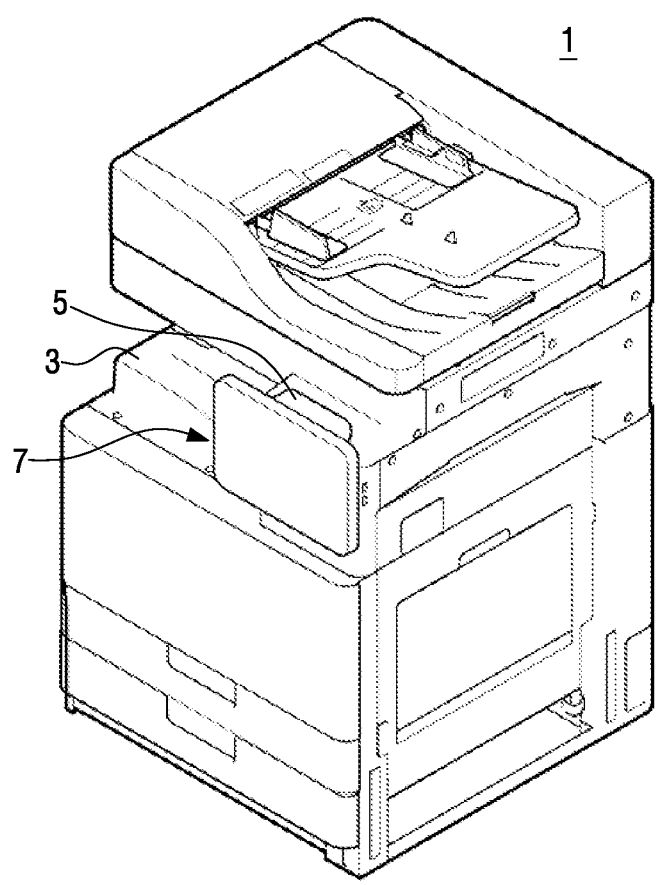
FIG. 1 is a perspective view of an image forming apparatus having a display device in the related art.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail because they would obscure the exemplary embodiments with unnecessary detail.

Hereinafter, exemplary embodiments of the present disclosure will be described in detail with reference to the accompanying drawings. In order to help understanding of the present disclosure, sizes of some constituent elements illustrated in the drawings may be exaggerated for clarity in explanation.

Hereinafter, referring to FIGS. 2 to 7, the configuration of a display device 100 according to an embodiment of the present disclosure will be described in detail.

Figure 2:
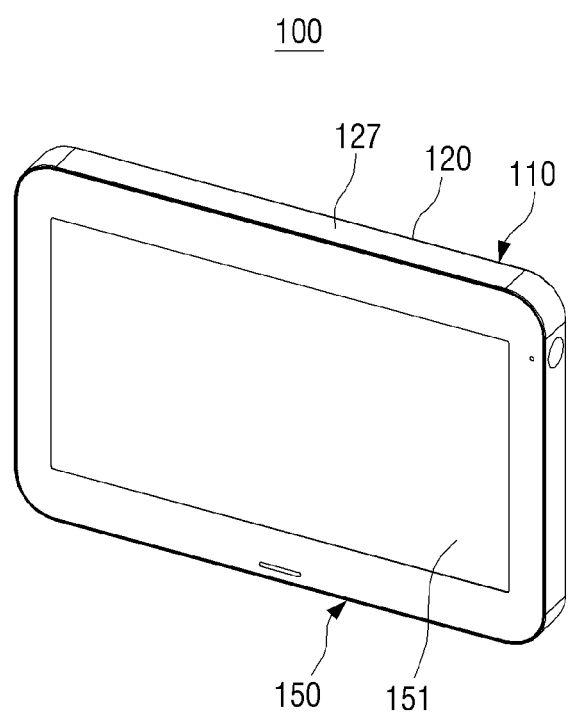
FIG. 2 is an assembled perspective view illustrating a display device of an image forming apparatus according to an embodiment of the present disclosure.
Figure 3:
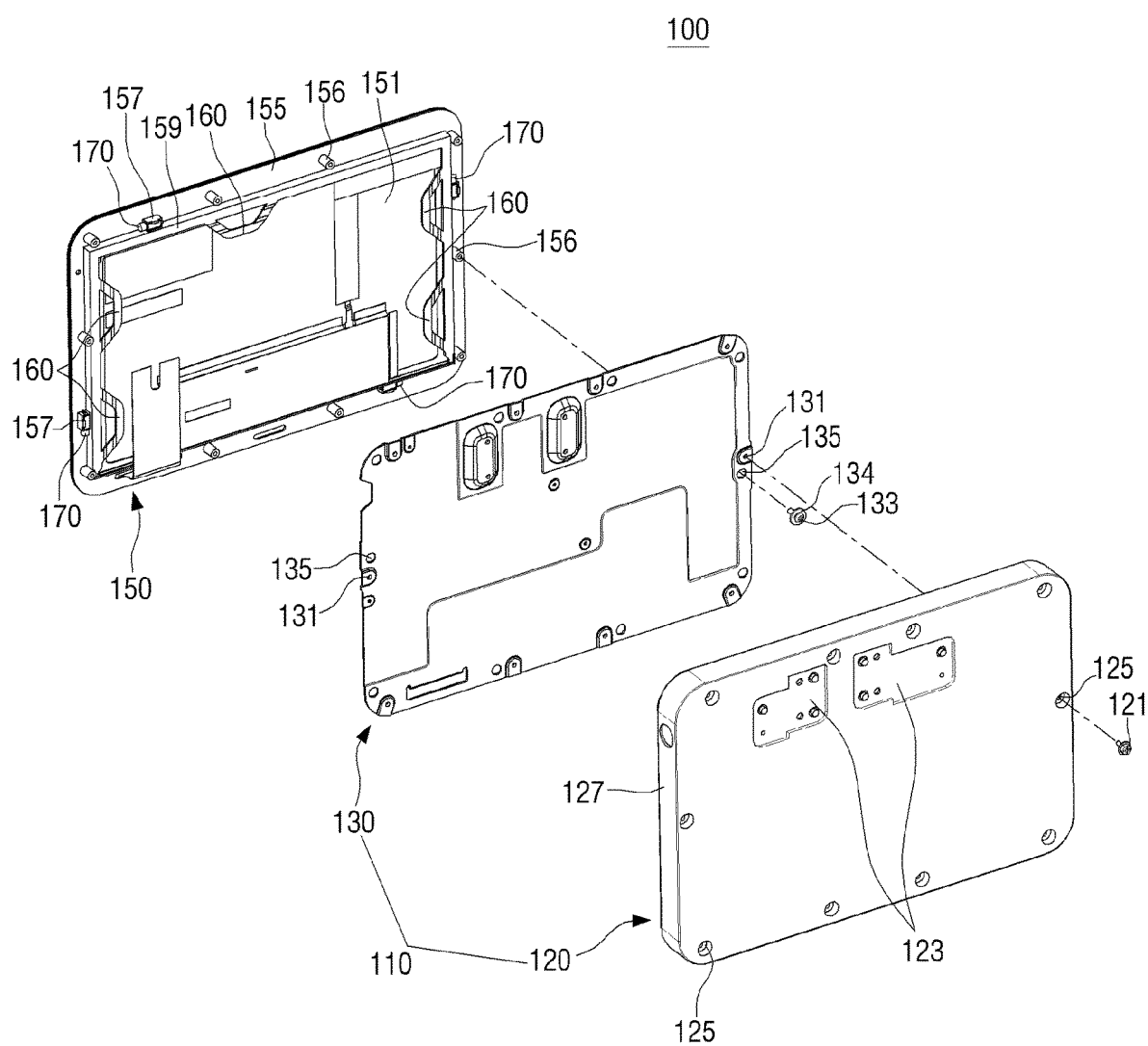
FIG. 3 is an exploded perspective view illustrating a display device of an image forming apparatus according to an embodiment of the present disclosure.
Figure 4:
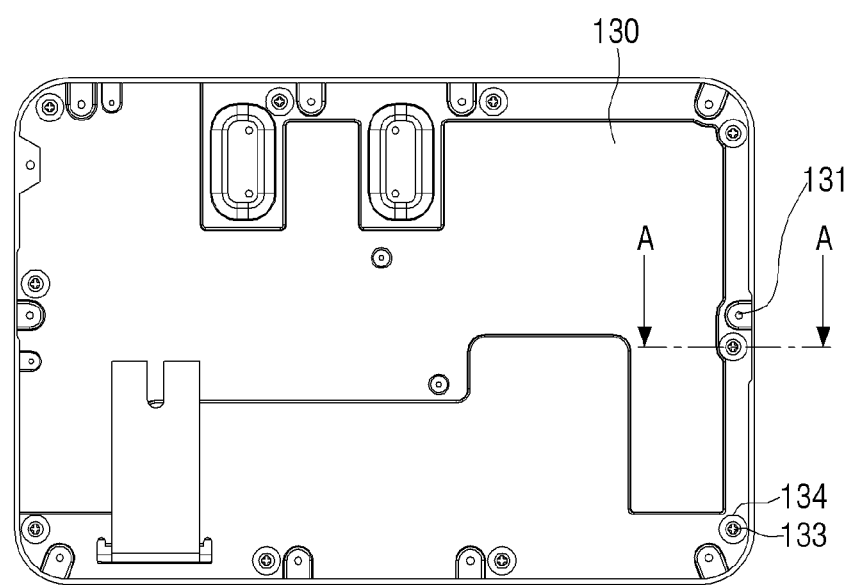
FIG. 4 is a rear view illustrating a display device of an image forming apparatus according to an embodiment of the present disclosure in a state where a rear housing of a base is omitted.

Referring to FIGS. 2 to 4, a display device, or user interface, 100 according to an embodiment of the present disclosure may include a base 110, a display 150 elastically supported on the base 110, and a plurality of vibrators 170 for vibrating the display 150.

The base 110 supports the display 150, and may be hinge-connected to a part of a main body 3 of an image forming apparatus 1 through a hinge arm 5 (see FIG. 1). Accordingly, the base 110 can set an appropriate angle of the display device 100 in accordance with the posture of a user who uses the image forming apparatus 1.

The base 110 may include a rear housing 120, and a support plate 130 separably coupled to the rear housing 120 through a plurality of fastening screws 121.

A fixing groove 123, in which one end of the hinge arm 5 is fixed, is formed on a rear surface of the rear housing 120, and a plurality of through-holes 125, which are penetrated by the fastening screws 121, respectively, are formed at predetermined intervals along the perimeter of the rear surface.

Further, an edge portion 127 is formed along a side portion of the rear housing 120. The edge portion 127 surrounds a side end portion of the display 150. In this case, an inner surface of the edge portion 127 is spaced apart from the side end portion of the display 150 at a predetermined distance so that the edge portion 127 does not rub or collide with the side end portion of the display 150 when the display 150 vibrates in a vertical, or orthogonal, direction with respect to the base 110. This structure can prevent the strength of the vibrations from being reduced due to friction or collision of the side end portion of the display 150 with the inner surface of the edge portion 127. As described above, by reducing causes that may interfere with the vibrations of the display 150, the vibrations of the display 150 are minimally transferred to the base 110, and may be concentrated in the display 150. Accordingly, the vibration efficiency can be maximized even if small vibrators 170 are used.

The support plate 130 is fixed to a front surface of the rear housing 120 through the plurality of fastening screws 121, and a plurality of fastening holes 131, through which the plurality of fastening screws 121 are fastened, are formed at predetermined intervals along the perimeter of the support plate 130.

Further, the support plate 130 is arranged in the rear of the display 150, and is connected to the display 150 through a plurality of fixing screws 133. In this case, a support 160 of the display 150 is elastically supported on a front surface of the support plate 130, and is arranged to be spaced apart from a rear surface of the display 150 at a predetermined distance so that the display 150 can move in a direction that becomes further apart from or closer to the support plate 130 when the display 150 vibrates. The plurality of fixing screws 133 prevent the display 150 from being separated from the support plate 130 as a flange 134 (see FIG. 5) that is formed on a head interferes with a part (peripheral portion of an insertion hole 135) of the rear surface of the support plate 130.

The display 150 may include a touch screen 151, a frame 155 fixed to a rear surface of the touch screen 151, and a support 160 integrally formed with the frame 155.

The touch screen 151 displays various kinds of setting information and printing information of the image forming apparatus 1. Further, the touch screen 151 may receive a user's touch input, convert the user's touch input into an electrical signal, and transmit the electrical signal to a controller (not illustrated). In this case, the controller operates the vibrators 170 in accordance with the touch input signal that is input through the touch screen 151 to vibrate the display 150 whenever the touch input is made on the touch screen 151. Accordingly, the user can clearly recognize that the user's touch input has been accurately made because the display 150 vibrates in response to the user's touch input (command input operation through making a part of a user's body or a separate touch pen come in contact with a predetermined region of the touch screen 151.

The frame 155 may be roughly in the form of a rectangular closed loop corresponding to the roughly rectangular touch screen 151. The front surface of the frame 155 is fixed to the rear surface of the touch screen 151, and a support 160 is formed to project from the rear surface of the frame 155. The frame 155 may be made of flexible plastic, and may be integrally manufactured with the support 160 through injection molding.

Further, a plurality of bosses 156, to which the plurality of fixing screws 133 are fastened, are formed on the rear surface of the frame 155 at predetermined intervals. The plurality of bosses 156 are respectively inserted into the plurality of insertion holes 135 of the support plate 130. As described above, the plurality of bosses 156 are inserted into the plurality of insertion holes 135, and if vibrations are generated by the vibrators 170, the display 150 moves in a vertical direction with respect to the support plate 130 (i.e., a direction in which the display 150 becomes close to or apart from the support plate 130).

The supports 160 may be arranged on the rear surface of the frame 155 at intervals. Referring to FIG. 3, one support 160 may be formed on an upper side of the rear surface of the frame 155, and two supports may be symmetrically formed on left and right sides of the rear surface of the frame 155, respectively. However the arrangement of the supports 160 is not limited to that as illustrated in FIG. 3, but may be symmetrically arranged on the upper and lower sides of the frame 155, respectively.

Figure 5:
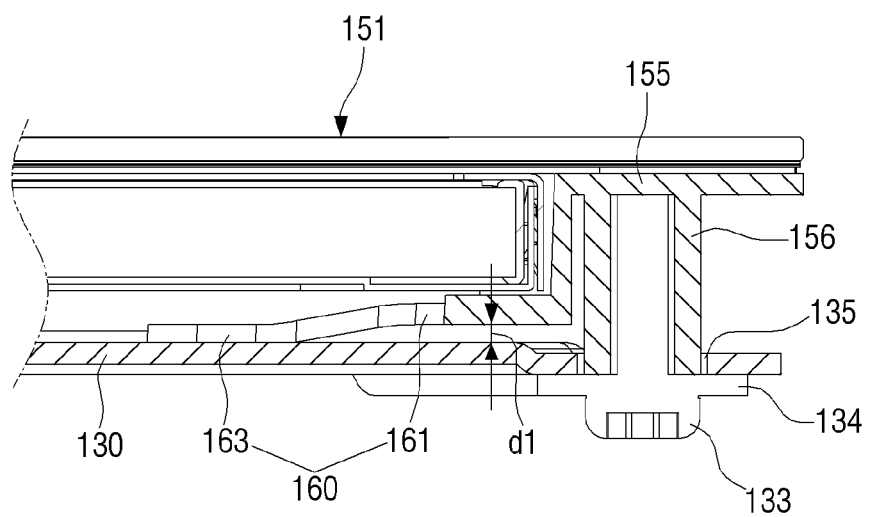
FIG. 5 is a partially enlarged cross-sectional view taken along line A-A of FIG. 4.

Referring to FIG. 5, one end portion 161 of the support 160 is formed to extend from an inner side 159 of the frame 155, and the other end portion 163 thereof is positioned more adjacent to the side of the support plate 130 than the one end portion 161 thereof. As described above, the one end portion 161 and the other end portion 163 of the support 160 can space the frame 155 and the support plate 130 apart from each other at a predetermined distance d1 due to a difference in height between the one end portion 161 and the other end portion 163 of the support 160.

The support 160 has different elastic forces whereby the support 160 is supported on the support plate 130 depending on distances between the display 150 and the support plate 130. That is, as the distance between the display 150 and the support plate 130 becomes narrower, the elastic force generated on the support 160 becomes higher. Due to the elastic force of the support 160 as described above, the display 170 moves in the vertical direction with respect to the support plate 130 through the vibrations generated by the vibrators 170.

As described above, even in the case of low vibrations (even in the case where outputs of the vibrators 170 are low), the support 160 can change the position of the display 150, and can accelerate the vibrations in accordance with its property to return to the original position due to its own elasticity when it is modified by the vibrations generated by the vibrators 170. As described above, in the case where the remaining portion of the display 150 except for the support 160 is completely apart, or isolated, from other structures, the display 150 can vibrate even by a low force due to the elasticity of the support 160. In this case, the structure for connection between the display 150 and the base 110 may come in contact with the display 150. Described another way, the display 150 is completely structurally isolated from the base 110, except for the connection by the elastic support 160, so that vibrations induced on the display are not weakened by being transferred to the base.

The vibrators 170 are small or ultra-small actuators, and as shown in FIG. 3, are fixedly coupled to brackets 157 that are formed on upper, lower, left, and right sides of the rear surface of the frame 155.

Further, the frequency of the vibrators 170 may coincide with the natural frequency of the support 160. In the case where the frequency of the vibrators 170 coincides with the natural frequency of the support 160, the amplitude can be maximized when the display 150 moves due to the vibrations.

Figure 6:
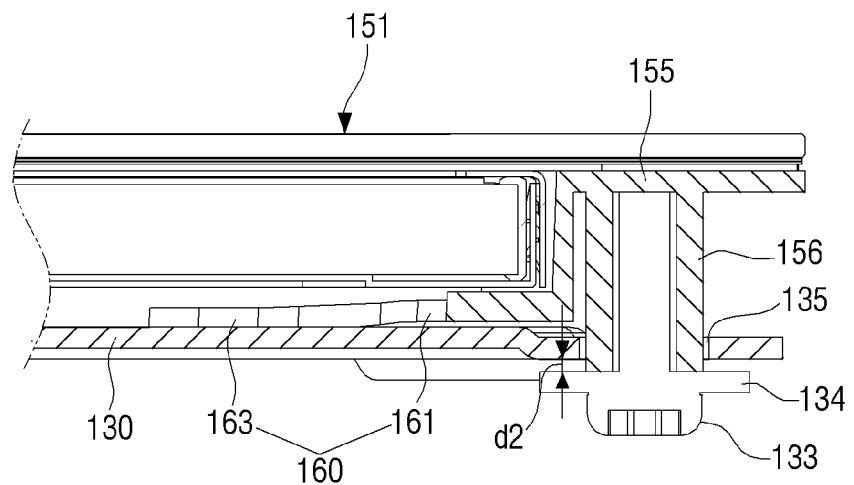
FIG. 6 is a partially enlarged cross-sectional view illustrating a state where a display illustrated in FIG. 5 is compressed to a base side by vibrations.
Figure 7:
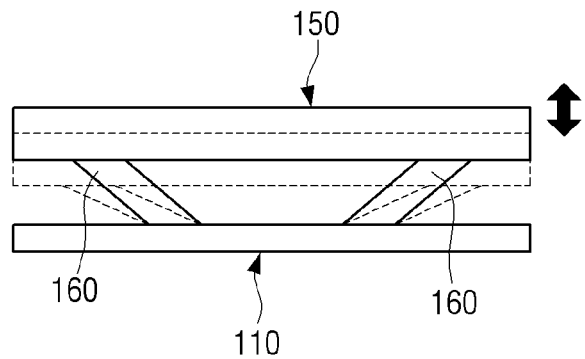
FIG. 7 is a schematic view illustrating a state where a display vibrates in a vertical direction with respect to a base.

Referring to FIGS. 5 to 7, the operation of the display device 100 as configured above will be described.

If the user makes a touch input on the touch screen 151 of the display 150, the touch input signal is transmitted to the controller, and the controller drives the vibrators 170 in response to the touch input signal.

The display 150, which is elastically supported on the support plate 130 by the supports 160, moves in the vertical direction with respect to the base 110 as shown in FIG. 7 through the driving of the vibrators 170. This is because the plurality of bosses 156 interfere in the horizontal direction within the insertion holes 135, and move only in the vertical direction. Further, the supports 160 repeat to be modified due to the vibrations of the display 150 and then to be restored by the elasticity thereof.

If the display 150 moves in the direction in which the display 150 becomes adjacent to the side of the base 110, the support plate 130 becomes apart for a predetermined distance d2 from the flange 134 of the fixing screw 133 as shown in FIG. 6, while if the display 150 moves in the direction in which the display 150 becomes apart from the side of the base 110, the support plate 130 comes in contact with the flange 134 of the fixing screw 133 as shown in FIG. 5.

While the display 150 moves in the vertical direction, the remaining portion except for the support 160 becomes apart from a structure around the display 150, that is, the base 110, without coming in contact with the base 110, and thus the vibrations of the display 150 are not transferred to the base 110. Accordingly, the weakening of the vibrations of display 150 and the occurrence of noise due to the interference with the base 110 can be prevented. In this case, the structure for connection between the display 150 and the base 110 may come in contact with the display 150.

Accordingly, in the display device 100, reactions (vibrations) can be immediately and accurately made with respect to the user's touch input. In addition, because small or ultra-small vibrators 170 can be used in the display device 100, the overall size of the display device 100 can be prevented from being increased.

Hereinafter, referring to FIGS. 8 to 13, the configuration of a display device 200 according to an embodiment of the present disclosure will be described.

Figure 8:
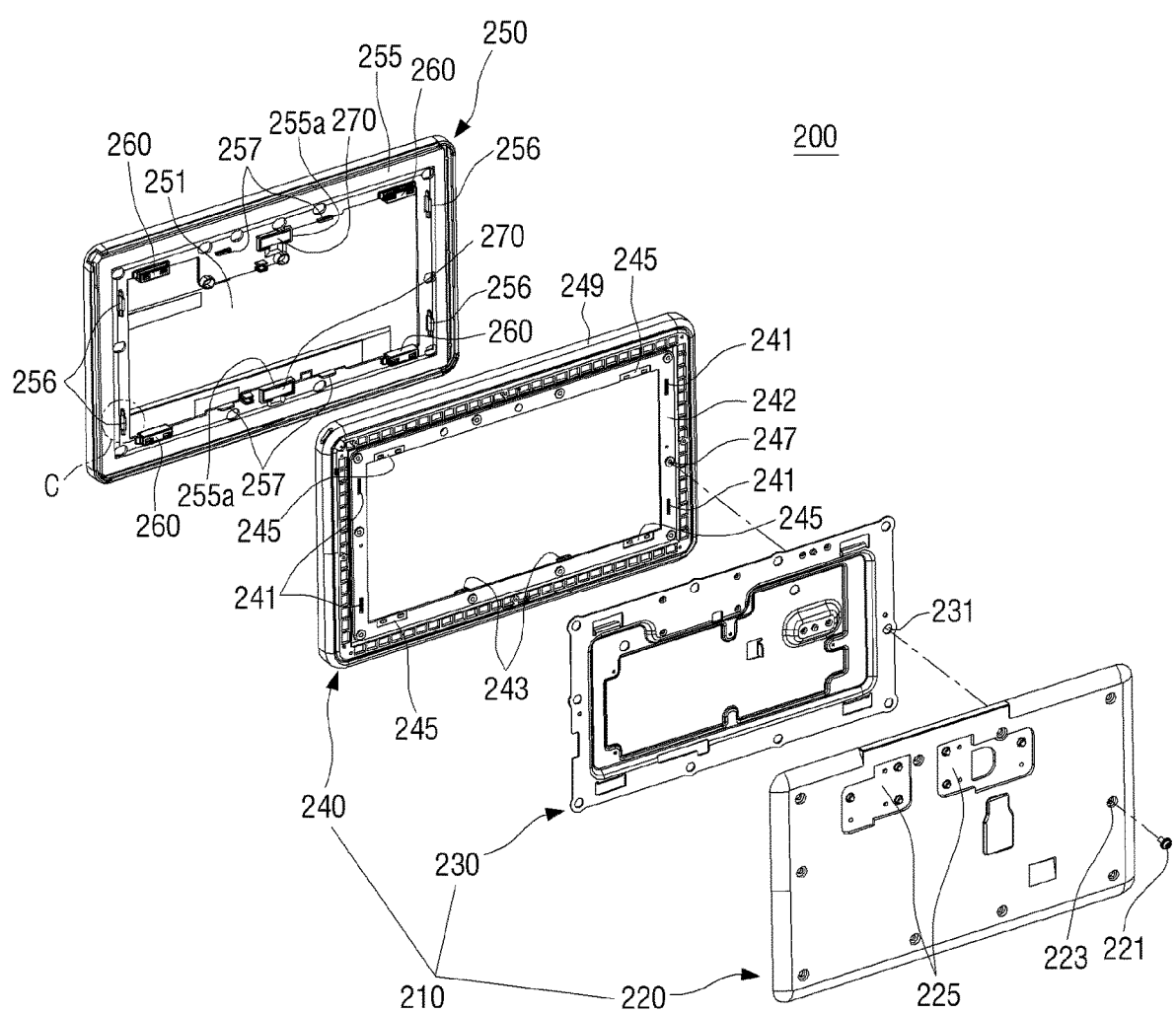
FIG. 8 is an exploded perspective view illustrating a display device of an image forming apparatus according to an embodiment of the present disclosure.

Referring to FIG. 8, a display device 200 according to an embodiment of the present disclosure may include a base 210, a display 250 elastically supported on the base 210, and a plurality of vibrators 270 for vibrating the display 250.

The base 210 may be hinge-connected to a part of a main body 3 of an image forming apparatus 1 through a hinge arm 5 (see FIG. 1), and may set an appropriate angle of the display device 200 in accordance with the posture of a user who uses the image forming apparatus 1.

The base 210 may include a rear housing 220, a support plate 230, and a support frame 240. In this case, the rear housing 220, the support plate 230, and the support frame 240 are successively coupled to one another through a plurality of fastening screws 221.

A fixing groove 225, in which one end of the hinge arm 5 is fixed, is formed on a rear surface of the rear housing 220, and a plurality of through-holes 223, which are penetrated by the plurality of fastening screws 221, respectively, are formed at predetermined intervals along the perimeter of the rear surface.

The support plate 230 may be arranged between the rear housing 220 and the support frame 240 to maintain the stiffness of the base 210, and may also serve to protect the rear surface of the display 250. On the support plate 230, a plurality of through-holes 231, which are penetrated by the plurality of fastening screws 221, respectively, are formed at predetermined intervals along the perimeter of the rear housing 220.

The support frame 240 may be arranged in the rear of the display 250, and may be roughly in the form of a rectangular closed loop that corresponds to the outline of the display 250. Further, on a rib-shaped inner end portion 242 of the support frame 240 having a predetermined thickness, a plurality of coupling holes 241, a plurality of mount portions 245, a plurality of snap coupling projections 243, and an edge portion 249 may be formed.

Figure 11:
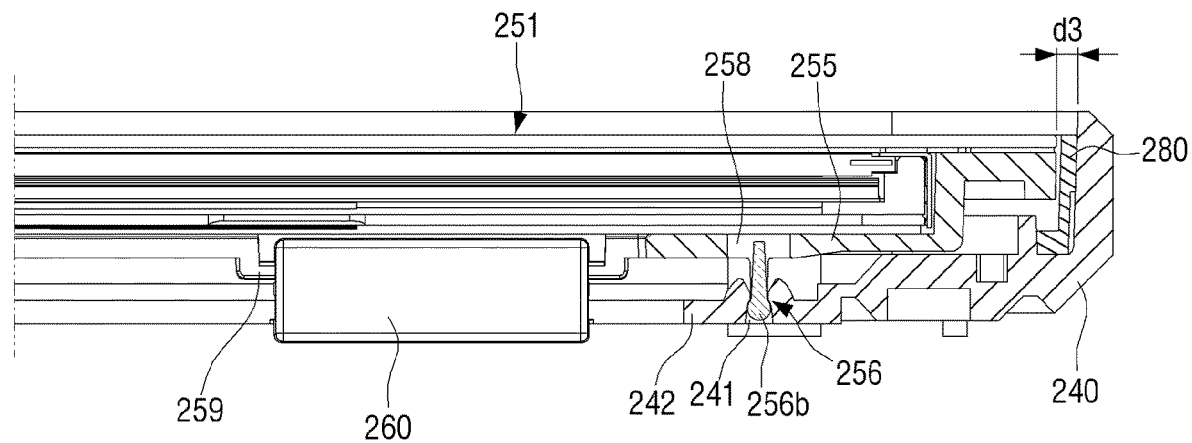
FIG. 11 is a partially enlarged cross-sectional view taken along line B-B of FIG. 10.

The plurality of coupling holes 241 are arranged by pairs on left and right sides of the inner end portion 242 of the support frame 240 at intervals. Coupling projections 256b of the support 256 are separably snap-coupled into the plurality of coupling holes 241. In this case, the coupling projections 256b of the support 256 are slidably arranged within the coupling holes 241 so that the display 250 can move in the horizontal direction with respect to the base 210. For this, the inside of the coupling hole 241 is formed as a curved surface that corresponds to the shape of the coupling projection 256b that is roughly in the form of a cylinder as shown in FIG. 11. The support frame 240 forms a plurality of fastening holes 247 around which the plurality of fastening screws 221 are fastened.

Figure 9:
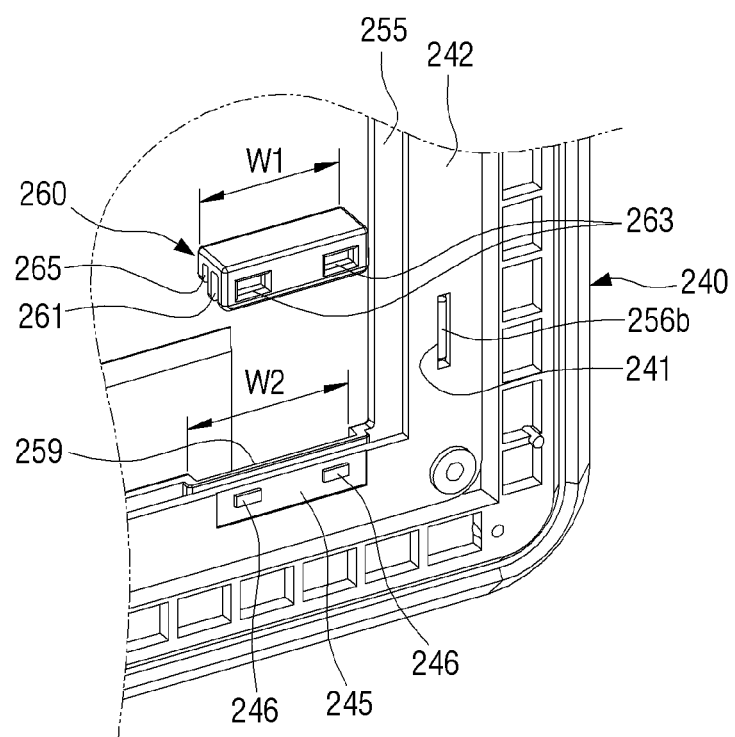
FIG. 9 is a partially enlarged perspective view illustrating a coupling structure of a guide member illustrated in FIG. 8.

Referring to FIG. 9, the plurality of mount portions 245 are coupled to mount grooves 261 of a plurality of guide members 260. In this case, a pair of locking projections 246 may be provided so that the guide members 260 can be firmly fixed to the mount portions 261. The pair of locking projections 246 may be coupled to a pair of locking grooves 263 provided on the guide members 260.

Figure 10:
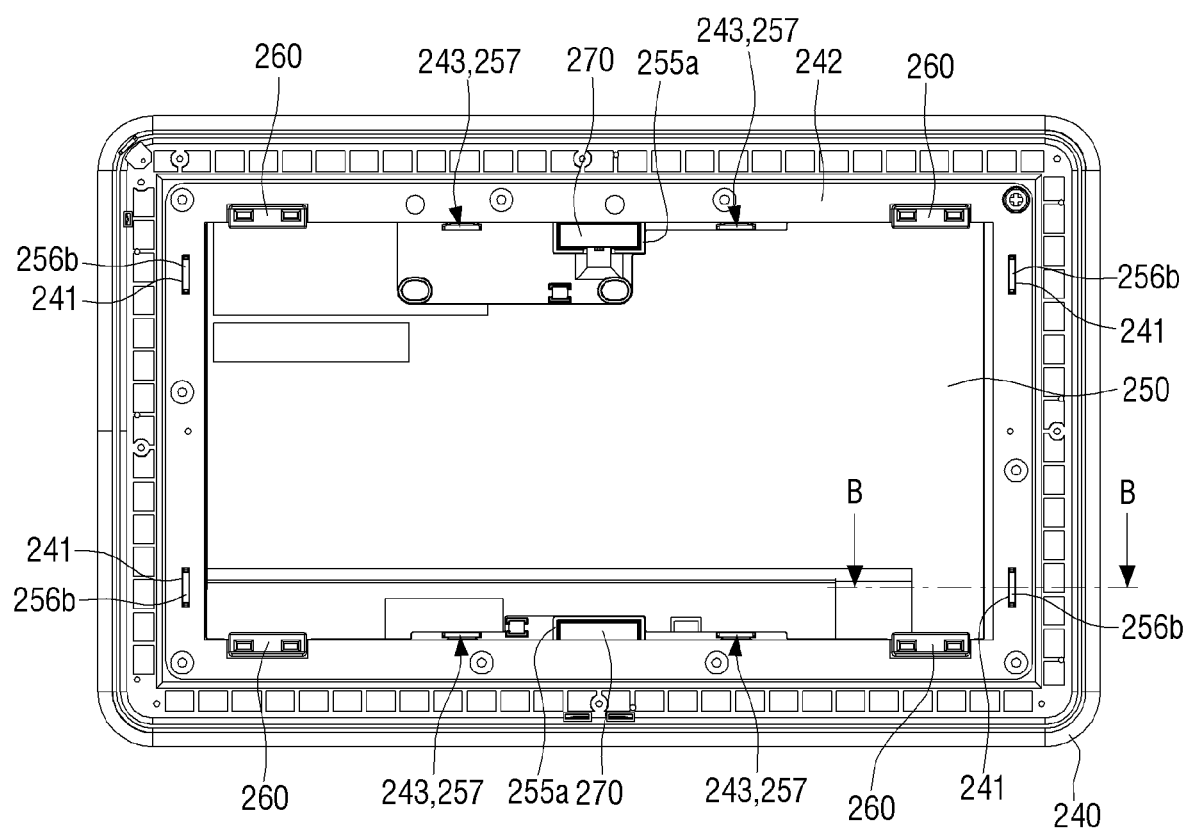
FIG. 10 is a rear view illustrating a display device of an image forming apparatus according to an embodiment of the present disclosure in a state where a base is omitted.

Referring to FIGS. 8 to 10, the plurality of snap coupling projections 243 are symmetrically arranged by pairs on the upper and lower sides of the inner end portion 242 of the support frame 240. The plurality of snap coupling projections 243 are snap-coupled to a plurality of snap coupling projections 257 formed on the frame 255 of the display 250. The plurality of snap coupling projections 243 and 257 which are snap-coupled to each other do not interfere with the movement of the display 250 in the horizontal direction, and have a coupling structure to prevent the support frame 240 and the frame 255 from being separated from each other in the vertical direction.

If the base 210 and the display 250 are coupled to each other (in this case, the display 250 is movably coupled to the base 210 in the horizontal direction), the edge portion 249 surrounds the side end portion of the display 250. In this case, an inner surface of the edge portion 249 is spaced apart from the side end portion of the display 250 for a predetermined distance d3 (see FIG. 11) so that the edge portion 249 does not rub or collide with the side end portion of the display 250 when the display 250 vibrates in the horizontal direction with respect to the base 210. This structure can prevent the strength of the vibrations from being reduced due to friction or collision of the side end portion of the display 250 with the inner surface of the edge portion 249. As described above, by reducing causes that may interfere with the vibrations of the display 250, the vibrations of the display 250 are minimally transferred to the base 110, but can be concentrated in the display 250. Accordingly, the vibration efficiency can be maximized even if small vibrators 270 are used.

On the other hand, in the case where the distance d3 is not sufficiently secured between the inner surface of the edge portion 249 and the side end portion of the display 250 due to tolerances that may occur during a manufacturing process and the display 250 moves in the horizontal direction, the side end portion of the display 250 may rub or collide with the inner surface of the edge portion 249. In this case, as shown in FIG. 11, a buffering member 280 may be arranged between the inner surface of the edge portion 249 and the side end portion of the display 250.

The buffering member 280 may prevent the side end portion of the display 250 from directly colliding with the inner surface of the edge portion 249 when the display 250 moves in the horizontal direction and thus may greatly reduce noise generated due to the collision.

The display 250 may include a touch screen 251, a frame 255 fixed to a rear surface of the touch screen 251, and a support 256 integrally formed with the frame 255. Because the touch screen 251 is the same as the touch screen 151 described above, explanation of the operation of the touch screen 251 will be omitted.

The frame 255 may be roughly in the form of a rectangular closed loop corresponding to the roughly rectangular touch screen 251. The front surface of the frame 255 is fixed to the rear surface of the touch screen 251, and the support 256 is formed to project from the rear surface of the frame 255. The frame 255 may be made of a flexible synthetic resin material, and may be integrally manufactured with the support 256 through injection molding. In this case, the frame 255 may be connected to the support frame 240 of the base 210 only through the support 256 without separate fixing screws.

Figure 12:
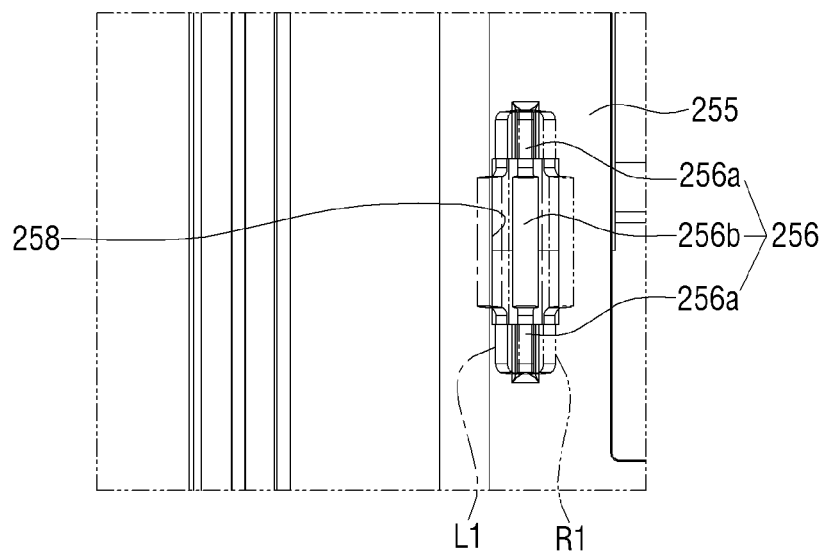
FIG. 12 is a schematic view illustrating a state where a display vibrates in a horizontal direction with respect to a base.

Referring to FIG. 12, the support 256 may include a support projection 256a and a coupling projection 256b.

The support 256 is repeatedly modified to a first modification position L1 on the left and a second modification position R1 on the right when the display 250 moves in the horizontal direction.

Both ends of the support projection 256a are formed to extend from the perimeter of a through-hole 258. At an upper end of the support projection 256a, the coupling projection 256b that is roughly in the form of a cylinder is formed along the length direction of the support projection 256a.

The support projection 256a and the coupling projection 256b are arranged roughly at right angles against the horizontal direction in which the display 250 moves. Along with such an arrangement, the coupling projection 256b is coupled to the coupling hole 241 of the support frame 240. In this case, because the coupling projection 256b slides only within the coupling hole 241 in a state where the coupling projection 256b does not secede from the coupling hole 241, the display 250 can smoothly move in the horizontal, or parallel, direction.

The guide member 260 serves to guide the display 250 so that the display 250 can move in the horizontal direction. As shown in FIG. 8, a plurality of guide members 260 may be provided to guide the upper and lower sides of the inner perimeter of the frame 255.

A mount groove 261 and a sliding groove 265, which are arranged in parallel to each other at intervals in the form of slots as shown in FIG. 9, are formed on the guide member 260. Further, a pair of locking grooves 263, which are snap-coupled to a pair of locking projections 246 of the mount portion 245 when the mount portion 245 of the support frame 240 is inserted into the mount groove 261, are formed on the guide member 260.

A sliding portion 259 of the frame 255 is slidably coupled to the sliding groove 265. In this case, in order to limit the distance in which the display 250 moves in the horizontal direction, the sliding portion 259 may be formed to have a width W2 that is wider than the width W1 of the sliding groove 265. Further, the width W2 of the sliding portion 259 may be set in consideration of the distance d3 between the side end portion of the display 250 and the inner surface of the edge portion 249.

A pair of vibrators 270 may be provided as small or ultra-small actuators. The pair of vibrators 270 are fixedly coupled to brackets 255a which are formed one by one on the upper and lower sides of the rear surface of the frame 255 as shown in FIG. 8. Further, the frequency of the vibrators 270 coincides with the natural frequency of the support 256. In the case where the frequency of the vibrators 270 coincides with the natural frequency of the support 256, the amplitude can be maximized when the display 250 moves due to the vibrations.

Figure 13:
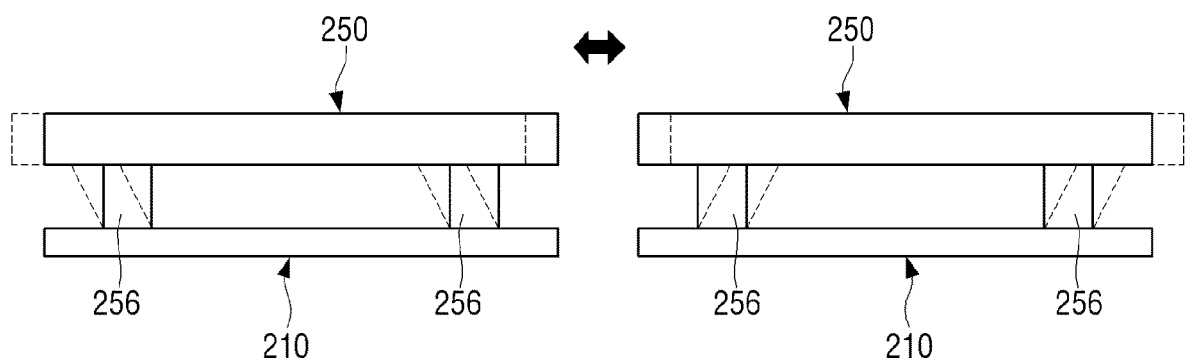
FIG. 13 is a schematic view illustrating a modified state of a support in a portion C indicated in FIG. 8 when a display vibrates.

Referring to FIG. 13, the operation of the display device 200 as configured above will be described.

The driving of the vibrators 270 in accordance with the user's touch input is the same as that described above.

The display 250 moves in the horizontal direction with respect to the base 210 as shown in FIG. 13 through the driving of the vibrators 270. This is because the guide member 260 interferes with the frame 255 in the vertical direction, and thus moves only in the horizontal direction with respect to the support frame 240. Further, the support 256 is repeatedly moved to a first modification position L1 and a second modification position R1 by the elasticity as shown in FIG. 12 due to the vibrations of the display 250.

While the display 250 moves in the horizontal direction, the remaining portion except for the support 256 becomes apart from a structure around the display 250, that is, the base 210, without coming in contact with the base 210, and thus the vibrations of the display 250 are not transferred to the base 210. Accordingly, the weakening of the vibrations of the display 250 and the occurrence of noise due to the interference with the base 210 can be prevented.

In the display device 200, reactions (vibrations) can be immediately and accurately made with respect to the user's touch input. Further, because small or ultra-small vibrators 270 can be used in the display device, the overall size of the display device 200 can be prevented from being increased.

Hereinafter, referring to FIGS. 14 to 17, the configuration of a display device 300 will be described. The display device 300 has a structure in which a display 350 vibrates in the horizontal direction with respect to a base 310.

Figure 14:
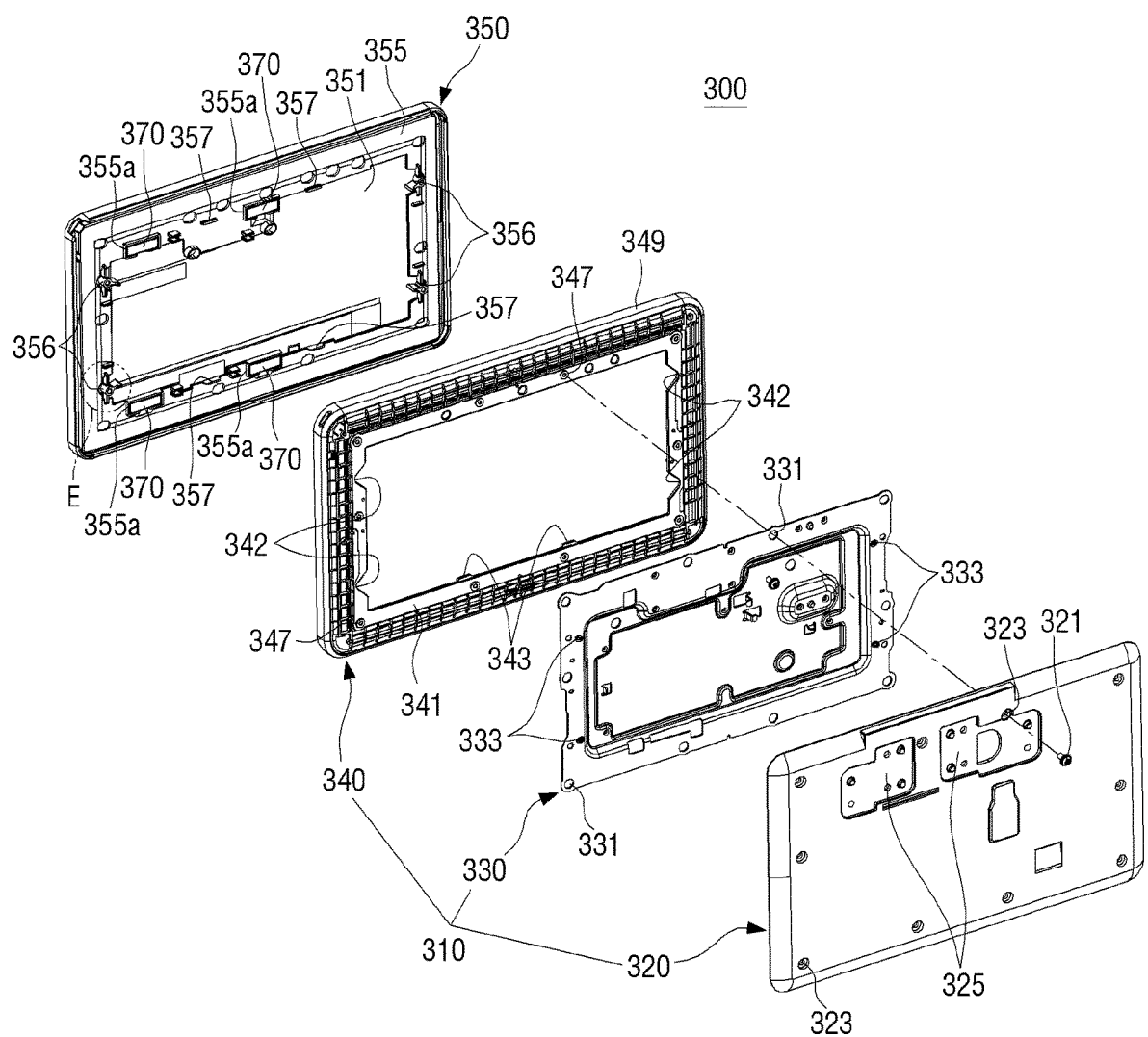
FIG. 14 is an exploded perspective view illustrating a display device of an image forming apparatus according to an embodiment of the present disclosure.

Referring to FIG. 14, the display device 300 may include a base 310, a display 350 elastically supported on the base 310, and a plurality of vibrators 370 for vibrating the display 350.

The base 310 may include a rear housing 320, a support plate 330, and a support frame 340, which are successively coupled to one another through a plurality of fastening screws 321.

A fixing groove 325 is formed on a rear surface of the rear housing 320, and a plurality of through-holes 323, which are penetrated by the plurality of fastening screws 321, respectively, are formed at predetermined intervals along the perimeter of the rear surface.

Because the rear housing 320 has the same structure as the structure of the rear housing 210 as described above, the explanation thereof will be omitted.

The support plate 330 may be arranged between the rear housing 320 and the support frame 340 to maintain the stiffness of the base 310, and may also serve to protect the rear surface of the display 350. On the support plate 330, a plurality of through-holes 331, which are penetrated by the plurality of fastening screws 321, respectively, are formed at predetermined intervals along the perimeter thereof. On the support plate 330, a plurality of fixing holes 333, into which fixing projections of a plurality of supports 356 are inserted to be fixed, are formed. The plurality of fixing holes 333 are arranged on the left and right sides of the support plate 330.

The support frame 340 may be arranged in the rear of the display 350, and may be roughly in the form of a rectangular closed loop that corresponds to the outline of the display 350. Further, on a rib-shaped inner end portion 341 of the support frame 340 having a predetermined thickness, a plurality of grooves 342, a plurality of snap coupling projections 343, and an edge portion 349 may be formed.

Figure 15:
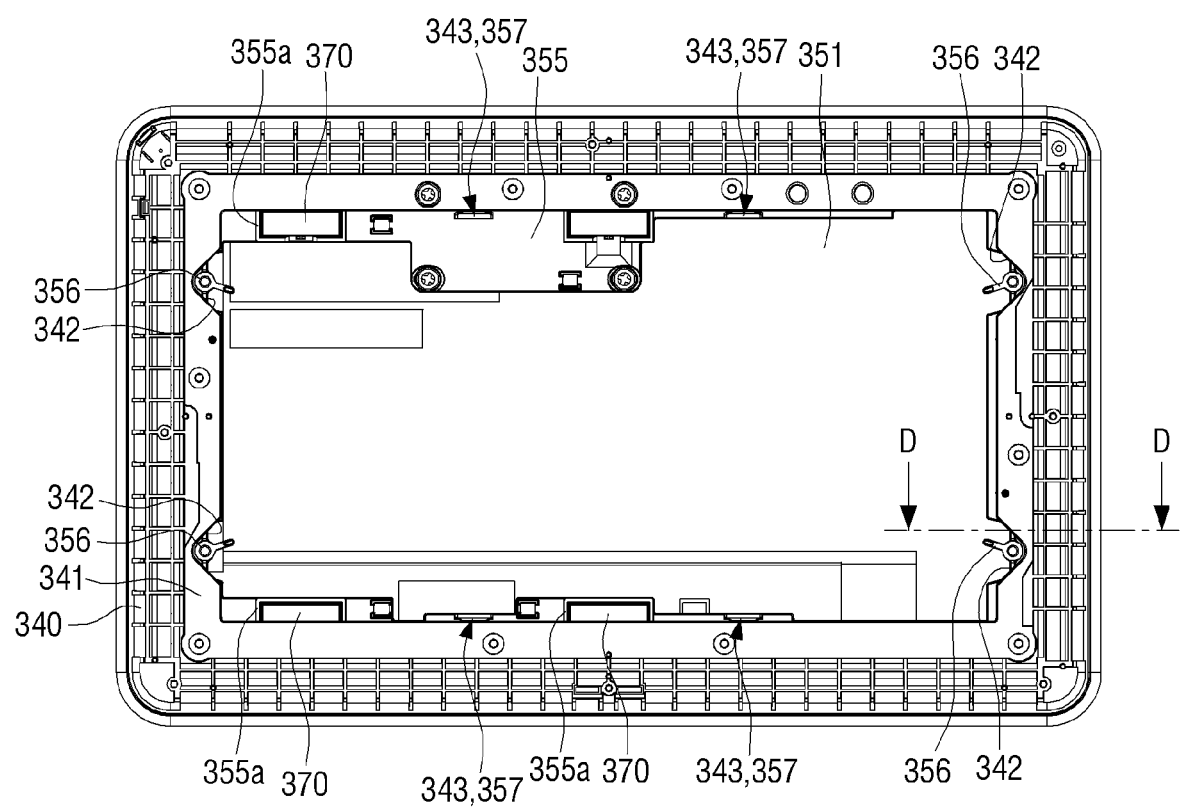
FIG. 15 is a rear view illustrating a display device of an image forming apparatus according to an embodiment of the present disclosure in a state where a rear housing of a base is omitted.

The plurality of grooves 342 are arranged by pairs on left and right sides of the inner end portion 341 of the support frame 340 at intervals. The plurality of grooves 342 enable a part of the support 356 to project toward the support frame 340 as shown in FIG. 15 when the support frame 340 is connected to a frame 355. The support frame 340 forms a plurality of fastening holes 347 around which the plurality of fastening screws 321 are fastened.

Referring to FIGS. 14 and 15, the plurality of snap coupling projections 343 are symmetrically arranged by pairs on the upper and lower sides of the inner end portion 341 of the support frame 340. The plurality of snap coupling projections 343 are snap-coupled to a plurality of snap coupling projections 357 formed on the frame 355 of the display 350. The plurality of snap coupling projections 343 and 357 do not interfere with the movement of the display 350 in the horizontal direction, and have a coupling structure to prevent the support frame 340 and the frame 355 from being separated from each other in the vertical direction.

If the base 310 and the display 350 are coupled to each other (in this case, the display 350 is movably coupled to the base 310 in the horizontal direction), the edge portion 349 surrounds the side end portion of the display 350.

In this case, an inner surface of the edge portion 349 is spaced apart from the side end portion of the display 350 for a predetermined distance d4 (see FIG. 16) so that the edge portion 349 does not rub or collide with the side end portion of the display 350 when the display 350 vibrates in the horizontal direction with respect to the base 310. This structure can prevent the strength of the vibrations from being reduced due to friction or collision of the side end portion of the display 350 with the inner surface of the edge portion 349. In this case, a structure for connection between the display 350 and the base 310 may come in contact with the display 350.

As described above, by reducing causes that may interfere with the vibrations of the display 350, the vibrations of the display 350 are minimally transferred to the base 310, but can be concentrated in the display 350. Accordingly, the vibration efficiency can be maximized even if small vibrators 370 are used.

Figure 16:
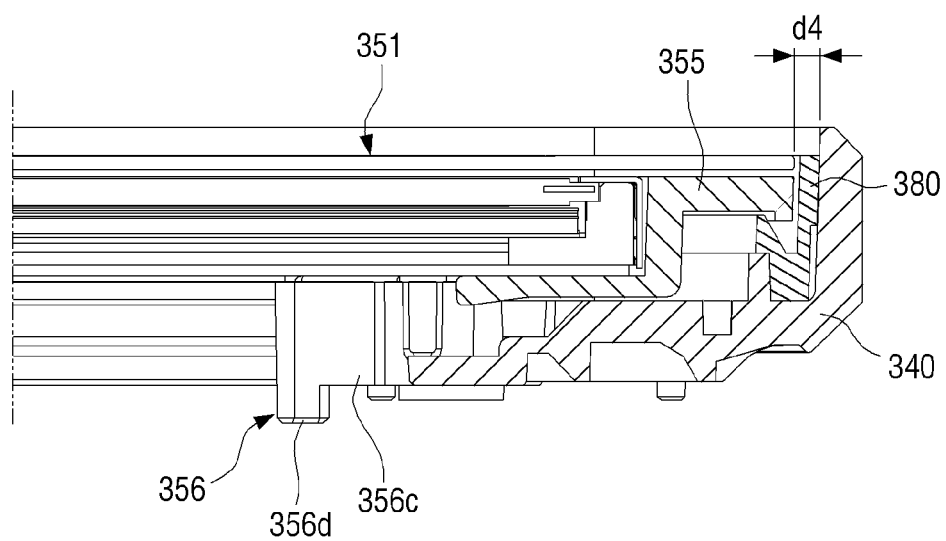
FIG. 16 is a partially enlarged cross-sectional view taken along line D-D indicated in FIG. 15.

On the other hand, in the case where the distance d4 is not sufficiently secured between the inner surface of the edge portion 349 and the side end portion of the display 350 due to tolerances that may occur during a manufacturing process and the display 350 moves in the horizontal direction, the side end portion of the display 350 may rub or collide with the inner surface of the edge portion 349. In this case, as shown in FIG. 16, a buffering member 380 may be arranged between the inner surface of the edge portion 349 and the side end portion of the display 350.

The buffering member 380 can prevent the side end portion of the display 350 from directly colliding with the inner surface of the edge portion 349 when the display 350 moves in the horizontal direction and thus can greatly reduce noises generated due to the collision.

The display 350 may include a touch screen 351, a frame 355 fixed to a rear surface of the touch screen 351, and a support 356 integrally formed with the frame 355. Because the touch screen 351 is the same as the touch screens 151 and 251, explanation of the operation of the touch screen 351 will be omitted.

The frame 355 may be roughly in the form of a rectangular closed loop corresponding to the roughly rectangular touch screen 351. The front surface of the frame 355 is fixed to the rear surface of the touch screen 351, and the support 356 is formed to project from the rear surface of the frame 355. The frame 355 may be made of a flexible synthetic resin material, and may be integrally manufactured with the support 356 through injection molding.

Figure 17:
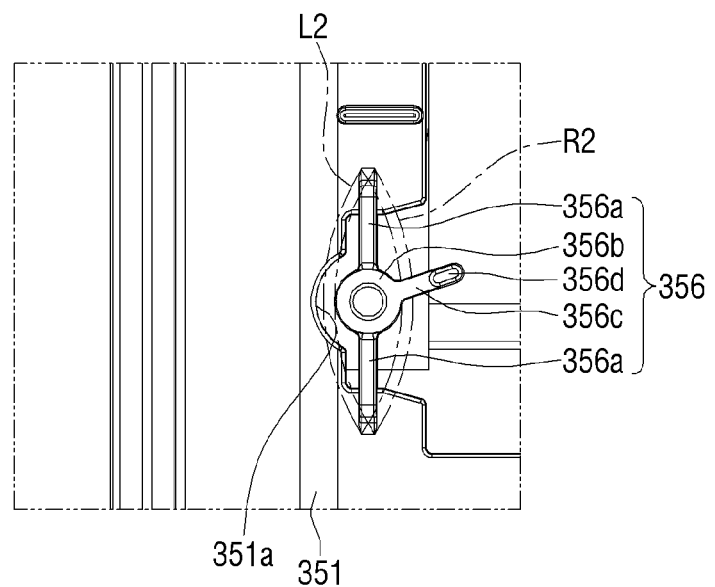
FIG. 17 is a schematic view illustrating a modified state of a support in a portion E indicated in FIG. 14 when a display vibrates.

Referring to FIG. 17, the support 356 may include a support projection 356a, a connector 356b, an arm 356c, and a fixing projection 356d.

A through-groove 351a is formed on one portion of the frame 355 that corresponds to the support 356 to help smooth modification of the support 356 with respect to the frame 355 when the display 350 moves in the horizontal direction. In this case, the support 356 is repeatedly modified to a third modification position L2 on the left and a fourth modification position R2 on the right when the display 350 moves in the horizontal direction.

Both ends of the support projection 356a are formed to extend from the perimeter of the through-groove 351a. At an upper end of the support projection 356a, the connector 356b is formed to project. The arm 356c is formed to project for a predetermined length from one side of the connector 356b, and the fixing projection 356d is formed at the front end of the arm 356c. The fixing projection 356d projects roughly at right angles against the arm 356c toward the support plate 330. In this case, the arm 356c may have a length such that the fixing projection 356d can be inserted into the fixing hole 333 of the support plate 330.

Four vibrators 370 may be provided as small or ultra-small actuators. The vibrators 370 are fixedly coupled to brackets 355a which are formed two by two at intervals on the upper and lower sides of the rear surface of the frame 355 as shown in FIG. 15. Further, two or more vibrators 370 may be provided.

The frequency of the vibrators 370 may coincide with the natural frequency of the support 356. In the case where the frequency of the vibrators 370 coincides with the natural frequency of the support 356, the amplitude can be maximized when the display 350 moves due to the vibrations.

According to the display device 300 as configured above, in the same manner as the display device 200, when the vibrators 370 are driven, the display 350 moves in the horizontal direction with respect to the base 310. In this case, the support 356 is repeatedly modified to the third modification position L2 and the fourth modification position R2 by the elasticity as shown in FIG. 17 due to the vibrations of the display 350.

While the display 350 moves in the horizontal direction, the remaining portion of the display 350 except for the support 356 becomes apart from a structure around the display 350, that is, the base 310, without coming in contact with the base 310, and thus the vibrations of the display 350 are not transferred to the base 310. Accordingly, the weakening of the vibrations of the display 350 and the occurrence of noise due to the interference with the base 310 can be prevented. Further, in the display device 300, in the same manner as the display devices 100 and 200, reactions (vibrations) can be immediately and accurately made with respect to the user's touch input. Further, because small or ultra-small vibrators 370 can be used in the display device, the overall size of the display device 300 can be prevented from being increased.

On the other hand, although it is exemplified that the display device 100, 200, or 300 according to the present disclosure is provided on the image forming apparatus 1, it will be apparent that the display device can also be applied to various kinds of medical equipment and industrial equipment, which require the display device, and various kinds of electronic equipment used at home in addition to the image forming apparatus.

Further, it is exemplified that the display device 100, 200, or 300 according to the present disclosure is additionally provided in specific equipment, but is not limited thereto. The display device may also be used as a portable device of a single product in the same manner as a tablet PC. In the case where the display device 100, 200, or 300 according to the present disclosure is used as a portable device as described above, the fixing groove 123, 225, or 325 of the rear housing 120, 220, or 320 of the base 110, 210, or 310 may be omitted.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. An electronic apparatus comprising:
    a main body; and
    a user interface including:
        a display including: a touch screen to receive a touch input on a front side of the touch screen, and a frame fixed to a rear side of the touch screen;
        a base, connectable to the main body of the electronic apparatus, having an edge portion that surrounds a side portion of the display and which is spaced apart from the side portion of the display in a direction perpendicular to a front-to-rear direction of the display;
        a buffering member, disposed on an inner side surface of the edge portion between the edge portion of the base and the side portion of the display and spaced apart from the side portion of the display in the direction perpendicular to the front-to-rear direction of the display, to prevent the side portion of the display from contacting the edge portion of the base when the display moves in the direction perpendicular to the front-to-rear direction of the display;
        a vibrator provided on the display and to induce vibrations on the display based on the received touch input; and
        a support connecting the base to the display so that the display is structurally isolated from the base except for being connected by the support, to thereby reduce a transfer of the vibrations on the display to the base.

2. The electronic apparatus as claimed in claim 1, wherein the display is elastically supported on the base through the support.

3. The electronic apparatus as claimed in claim 1, wherein the support supports the display so that the display vibrates in a direction orthogonal to the base.

4. The electronic apparatus as claimed in claim 3, wherein a rear surface of the display is arranged to be apart from a front surface of the base.

5. The electronic apparatus as claimed in claim 4, wherein the display is connected to the base through a fastener to maintain a gap distance from the base.

6. The electronic apparatus as claimed in claim 1, wherein the support supports the display so that the display vibrates in a direction parallel to the base.

7. The electronic apparatus as claimed in claim 6, wherein the support is symmetrically formed on opposite sides of the display.

8. The electronic apparatus as claimed in claim 7, further comprising at least one guide member having one side fixed to the base and to guide the display in the parallel direction, wherein a slot, into which a part of the display is slidably inserted, is formed on the guide member.

9. The electronic apparatus as claimed in claim 6, wherein a part of the support is separably coupled to the base.

10. The electronic apparatus as claimed in claim 9, wherein the support comprises:
    a support projection extending from the display; and
    a coupling projection formed to extend from a front end of the support projection and slidably coupled to a coupling hole formed on the base.

11. The electronic apparatus as claimed in claim 9, wherein the support comprises:
    a coupling projection extending from the display;
    an arm formed at a front end of the coupling projection; and
    a fixing projection formed at a front end of the arm and coupled to a fixing hole formed on the base.

12. The electronic apparatus as claimed in claim 1, wherein a frequency of the vibrator coincides with a natural frequency of the support.

13. The electronic apparatus as claimed in claim 1, wherein the support is formed to project from the frame.

14. The electronic apparatus as claimed in claim 13, wherein the frame and the support are integrally injection-molded.

15. The electronic apparatus as claimed in claim 1, wherein the electronic apparatus is at least one of an image forming apparatus, medical equipment, and industrial equipment.

16. An image forming apparatus, comprising:
    a main body; and
    a user interface including:
        a display including: a touch screen to receive a touch input on a front side of the touch screen, and a frame fixed to a rear side of the touch screen;
        a base, connectable to the main body of the image forming apparatus, having an edge portion that surrounds a side portion of the display and which is spaced apart from the side portion of the display in a direction perpendicular to a front-to-rear direction of the display;
        a buffering member, disposed on an inner side surface of the edge portion between the edge portion of the base and the side portion of the display and spaced apart from the side portion of the display in the direction perpendicular to the front-to-rear direction of the display, to prevent the side portion of the display from contacting the edge portion of the base when the display moves in the direction perpendicular to the front-to-rear direction of the display;
        a vibrator fixed to the display and to induce vibrations on the display based on the received touch input; and
        a plurality of supports separably connecting the base to the display so that the display is structurally isolated from the base except for being connected by the plurality of supports, to thereby reduce a transfer of the vibrations on the display to the base.

17. The image forming apparatus as claimed in claim 16, wherein the display is elastically supported on the base through the plurality of supports.

18. The image forming apparatus as claimed in claim 17, wherein the plurality of supports are made of an elastic material.

19. The image forming apparatus as claimed in claim 16, wherein
    the base includes a rear housing, a support frame connected to the frame of the display via the plurality of supports, and a support plate disposed between the support frame and the rear housing,
    the edge portion is formed in the support frame, and
    at least one of the plurality of supports comprises:
        a support projection which extends in the front-to-rear direction through a through-hole provided in a rear side of the frame of the display, and
        a coupling projection which extends from the support projection into a coupling hole provided in the support frame, the coupling projection being moveable in the direction perpendicular to the front-to-rear direction of the display when the display moves in the direction perpendicular to the front-to-rear direction of the display.

20. The image forming apparatus as claimed in claim 16, wherein the base includes a rear housing, a support frame connected to the frame of the display via the plurality of supports, and a support plate disposed between the support frame and the rear housing, and at least one of the plurality of supports is moveable in the direction perpendicular to the front-to-rear direction when the display moves in the direction perpendicular to the front-to-rear direction, the at least one of the plurality of supports comprising:

a connector protruding in the front-to-rear direction from a rear side of the frame, a first support projection extending from a first side of the connector and a second support projection extending from a second side of the connector, opposite of the first side of the connector, each of the first and second support projections protruding in the front-to-rear direction through a through-hole provided in the rear side of the frame of the display, and an arm having one end that extends from a third side of the connector and another end having a fixing projection extending in the front-to-rear direction into a fixing hole of the support plate.

\* \* \* \* \*